United States Patent
Sundarrao (10) Patent No.: US 9,273,762 B1
(45) Date of Patent: Mar. 1, 2016

(54) FOUR-LINKAGE BACKPACK RELOCATOR

(71) Applicant: Stephen Sundarrao, Temple Terrace, FL (US)

(72) Inventor: Stephen Sundarrao, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 337 days.

(21) Appl. No.: 14/055,393

(22) Filed: Oct. 16, 2013

Related U.S. Application Data (60) Provisional application No. 61/714,511, filed on Oct. 16, 2012.

(51) Int. Cl.
*A61G 5/10* (2006.01)
*F16H 21/40* (2006.01)
*F16H 21/10* (2006.01)

(52) U.S. Cl.
CPC *F16H 21/40* (2013.01); *A61G 5/10* (2013.01); *F16H 21/10* (2013.01); *Y10T 74/18176* (2015.01)

(58) Field of Classification Search
CPC ......... F16H 21/00; F16H 21/10; F16H 21/12; F16H 21/14; F16H 21/16; F16H 21/32; F16H 21/40; F16H 21/44; A61H 2003/002; A61H 2003/003; A61H 2003/004; Y10T 74/18176; Y10T 74/18856; A61G 5/10; A61G 2005/1094
USPC .............. 74/40, 469, 519; 224/407, 443–444, 224/282, 42.34, 42.36, 549; 280/304.1
See application file for complete search history.

(56) References Cited

U.S. PATENT DOCUMENTS

| | | | | |
|---|---|---|---|---|
| 3,263,516 | A * | 8/1966 | Chisholm | B23Q 1/5468 33/23.01 |
| 4,520,682 | A * | 6/1985 | Eitzinger | F16H 21/20 74/103 |
| 4,861,059 | A | 8/1989 | Shirk | |
| 4,919,443 | A * | 4/1990 | Kehler | A61G 5/10 248/145 |
| 5,180,181 | A * | 1/1993 | Letechipia | A61G 5/10 224/282 |
| 5,299,824 | A * | 4/1994 | Roberts | A61G 5/10 108/44 |
| 5,326,063 | A * | 7/1994 | Stevens | A61G 5/04 248/282.1 |
| 7,845,667 | B2 * | 12/2010 | Mahler | A61G 5/10 224/282 |
| 2005/0001405 | A1 * | 1/2005 | Macocha | A61G 5/10 280/304.1 |

(Continued)

OTHER PUBLICATIONS

Chanchavac, et al. Wheelchair Assist Devices. Bioengineering Conference, 2001. Proceedings of the IEEE 27th Annual Northeast, pp. 97-98.

(Continued)

*Primary Examiner* — Justin Larson
*Assistant Examiner* — Scott McNurlen
(74) *Attorney, Agent, or Firm* — Robert J. Varkonyi; Smith & Hopen, P.A.

(57) ABSTRACT

A device to help an individual with a disability carry his or her bag or storage unit on their wheelchair or other mobility device, without requiring a large space to deploy the storage and retrieval product. The invention consists of a set of arms, connected to a sliding mechanism along a track. When the user wishes to access his or her belongings, the bag slides from a storage position behind the wheelchair to a retrieval position perpendicular to the wheelchair's armrest. The deployment process is accomplished without rotating the entire mechanism around a central axis. Thus, the invention keeps the storage unit close to the wheelchair and therefore takes up less space during retrieval and increases stability during deployment.

19 Claims, 6 Drawing Sheets

(56) References Cited

U.S. PATENT DOCUMENTS

2010/0058667 A1* 3/2010 Lambertini ........... E05D 7/0415
                                                        49/157
2011/0233890 A1* 9/2011 Jutkiewicz ............... A61G 5/10
                                                       280/202
2014/0166711 A1* 6/2014 Mitchell .................. A61G 5/10
                                                       224/407

OTHER PUBLICATIONS

Perez, Jorge. Backpack Retriever. National Science Foundation 2001 Engineering Senior Design Projects to Aid Persons with Disabilities.

* cited by examiner

FOUR-LINKAGE BACKPACK RELOCATOR

CROSS REFERENCE TO RELATED APPLICATIONS

This application claims priority to U.S. Provisional Patent Application No. 61/714,511, entitled "Four-Linkage Backpack Relocator", filed Oct. 16, 2012, which is herein incorporated by reference.

FIELD OF INVENTION

This invention relates to a device facilitating storage on a mobility device. More specifically, the invention relocates a bag, storage unit, communication device, or computer from a storage position behind the mobility device, like a wheelchair, to an accessible position alongside the mobility device.

BACKGROUND OF THE INVENTION

Wheelchairs and other mobility devices increase independence for individuals with disabilities. However, wheelchairs do not provide storage for personal belongings. Individuals using wheelchairs as part of their every-day lives often have unique needs when carrying personal belongings and other items. For example, the typical student will often carry his or her books in a backpack when going to and from school. These packs are generally a convenient method for transporting books, but a wheelchair user may find certain aspects of a backpack inconvenient or undesirable for their needs. For instance, during transport the backpack must be placed on the chair in a position that would be secure, such as the rear of the chair. Unfortunately, the secure position may make it extremely difficult to retrieve books and other personal effects from the securely attached pack. Consequently, what is needed is a device that would allow a disabled individual to secure a storage device to a chair for transport while allowing the individual convenient access to the contents of the pack when desired.

The need for storage on wheelchairs and other mobility devices has been recognized for years. However, the articles designed to satisfy this need tend to be bulky, take up large amounts of room while deploying from a stored state to an assessable state, or drastically and adversely affect the stability of the wheelchair or the ability to clear ingress and egress points. Further, some storage devices are not readily accessible by the individual with a disability. For example, Shirk (U.S. Pat. No. 4,861,059) provides for a vertically pivoting box behind the wheelchair. The apparatus clamps to the wheelchair, with the storage unit pivoting on rods mounted to the base of the storage unit. However, the box does not rotate to a position where the wheelchair user may freely access the box.

Kekler (U.S. Pat. No. 4,919,443) and Letechipia (U.S. Pat. No. 5,180,181) both describe a storage box or bag that rotates horizontally on an axis mounted to one edge of the storage box or bag, and rotates from behind the wheelchair to a position above the armrest. Likewise, Roberts, et al. (U.S. Pat. No. 5,299,824) describes a tray that horizontally rotates from the back of the wheelchair to the front, on its axis. More recently, a focus on backpack storage and retrieval solutions has prompted devices designed to hold a backpack, stored behind the wheelchair and deployed horizontally beside the wheelchair's armrest, as evidenced by Perez, et al. (NSF 2001), Chanchavac, et al. (Wheelchair assist devices. Bioengineering Conference, 2001. Proc. Of the IEEE 27th Annual Northeast, 97-98), and Matthew (US Pub. No. 2005/0001405). However, these new designs still rely on pivoting the storage unit, here a backpack, around a fixed axis. The bag rotates around on a boom from the rear of the wheelchair to the side, allowing the wheelchair user access. Thus, the new designs still require large areas to deploy, limiting the usefulness of these products. Further, because these designs transfer the backpack through a large arc, to reach the side of the wheelchair, the wheelchair becomes increasingly unstable as the backpack reaches the apex of this arc. Moreover, these designs are not compatible across wheelchair manufacturers.

Therefore, what is needed is a device that does not rely on a rotating motion to retrieve the storage device, thereby taking up substantially less space during retrieval and reducing the instability inherent during deployment.

SUMMARY OF INVENTION

The inventive device is designed for use with a wheelchair or other mobility device, and provides a way to store belongings behind the wheelchair and to access the storage without requiring a large space to deploy the storage and retrieval product. When the user wishes to access his or her belongings, the bag slides from behind the wheelchair to the side of the chair, allowing the user access to the contents of the storage device. Previous designs pivot, taking up the full length of the retrieval product, as the product swings around on its axis.

The device mobility device-user to easily access a bag or other storage system by retrieving the bag from a store location behind the mobility device and transferring it, in an oblong path of travel, to the side of the mobility device. The inventive device has a housing, which has at least an upper horizontal wall, two longitudinal side walls, and two transverse side walls, thereby defining an interior lumen of the housing. The housing is adapted to mount to one side of the mobility device, specifically under the armrest.

A drive actuator is mounted within the housing, such that the actuator may freely rotate within the housing. The drive actuator is adapted to translate rotational motion from a motor to linear motion, and may be a threaded screw, chain, or other system known in the art which accomplishes this goal. A motor or crank is communication with the drive actuator. Optionally, a switch is mounted on the exterior wall of the device and is in electrical communication with the motor. A slider is connected to the drive actuator, such that the drive actuator causes the slider to slide, in a linear motion, between a first position and a second position. A linkage assembly mounts to the bottom of the slider on one end and a linkage mount on the other. The linkage mount is fixed to one side wall of the housing, providing a fulcrum point for the linkage assembly.

The housing optionally includes at least one support rail disposed adjacent to the drive actuator, and may include a plurality of support rails. In particular, as seen in the detailed description, the device optionally includes two support rails, one on either side of the drive actuator. Additionally, a transverse wall may be mounted in the lumen of the housing, adjacent to the motor, to separate the housing into two compartments. In particular, the wall may separate the lumen into an enclosed compartment for the motor, and a partially-open compartment for the slider.

The linkage assembly has a first linkage, with pivot points disposed on each end of the linkage, and a third pivot point disposed between the first and second pivot points. The first linkage is pivotally connected to the linkage mount at a pivot point on one end and a fourth linkage on the other end. A second linkage has pivot points disposed on each end of the linkage, and is pivotally attached to the first linkage, at its third pivot (mid-length) point. The other end of the second linkage is pivotally connected to the slider. A third linkage pivot points disposed on each end of the linkage, with one end connected to the slider and the other end connected to the forth linkage. Finally, a forth linkage is attached to the first and third linkages, as discussed. A receptacle is mounted to the fourth linkage providing a location to mount a bag or other storage system to the inventive device. Thus, the activation of the motor or crank causes the slider to move from the first position to the second position, causing the linkage assembly to rotate about a vertical axis. This moves the receptacle from an optional storage location positioned behind the wheelchair when the slider is in the second position to an optional position along the side of the wheelchair when the slider is in the first position.

A pin or other pivoting mount attaches second and third linkages to the slider. The lower wall of the housing has an opening, allowing the pin or pivoting mount to move concurrently with the slider. As such, the lower wall is optionally substantially open, open longitudinally along the center of the lower wall, or open longitudinally off-center of the lower wall.

BRIEF DESCRIPTION OF THE DRAWINGS

For a fuller understanding of the invention, reference should be made to the following detailed description, taken in connection with the accompanying drawings, in which:

FIGS. 1(A) and (B) are diagram showing cross sectional views of different embodiments of the invention. (A) A cross section of the sliding compartment looking toward the slider. The housing is shown completely open at the bottom. (B) A cross section of the sliding compartment showing the bottom partially enclosed. A longitudinal opening at the bottom permits the slider to interact with the linkage assembly.

FIGS. 3(A) and (B) are diagrams showing a cross-section of the device (A) at location "AA" or (B) at location "BB" in FIG. 2.

DETAILED DESCRIPTION OF THE PREFERRED EMBODIMENT

As used herein the terms distal, proximal, top, and bottom shall be applied to the device, as installed on a wheelchair. Proximal refers to the forward, or more forward, aspects of the device, whereas distal refers to the rear, or rearward, aspects of the device.

The present invention includes a device for retrieving a storage unit from a mobility device. As used herein, "mobility device" is defined as a device which allows an individual with a disability to move around. Illustrative examples include wheelchairs and scooters.

As used herein, the term "switch" is used to denote any component capable of turning off or on an electrical device.

As used herein, the term "longitudinal" means the axis running substantially parallel to the maximum linear dimension of the inventive article.

As used herein, the term "transverse" means the axis running substantially perpendicular to the maximum linear dimension of the inventive article As used herein, "lumen" is an inner volume defined by walls of the housing. The term includes hollow space not solid can have elements inside such as drive actuators, motors, support rails, etc.

As used herein, the term "drive actuator" means a device adapted to convert rotational motion to longitudinal movement. Examples of drive actuators include threaded screw, chain, belt, or rack and pinion.

As used herein, the term "substantially" means predominantly what is specified, but may deviate from the specified amount, such as by 15% or less.

As used herein, "slider" refers to an article designed to move over a surface while maintaining smooth continuous contact with the surface. As used herein, "smooth" means moving with substantially no bumps.

As used herein, the term "receptacle" means an object or device configured to receive and retain an article, such as a bag.

As used herein, the term "distal" refers to part of the object directed toward, or closest to, the backrest portion of the mobility device, and farthest from the footrest portion of the mobility device or portion of the mobility device where a footrest would be placed for use.

As used herein, the term "substantially perpendicular" means within a 20° deviation from a right angle, i.e. perpendicular, to the reference object.

EXAMPLE

Figure 1:
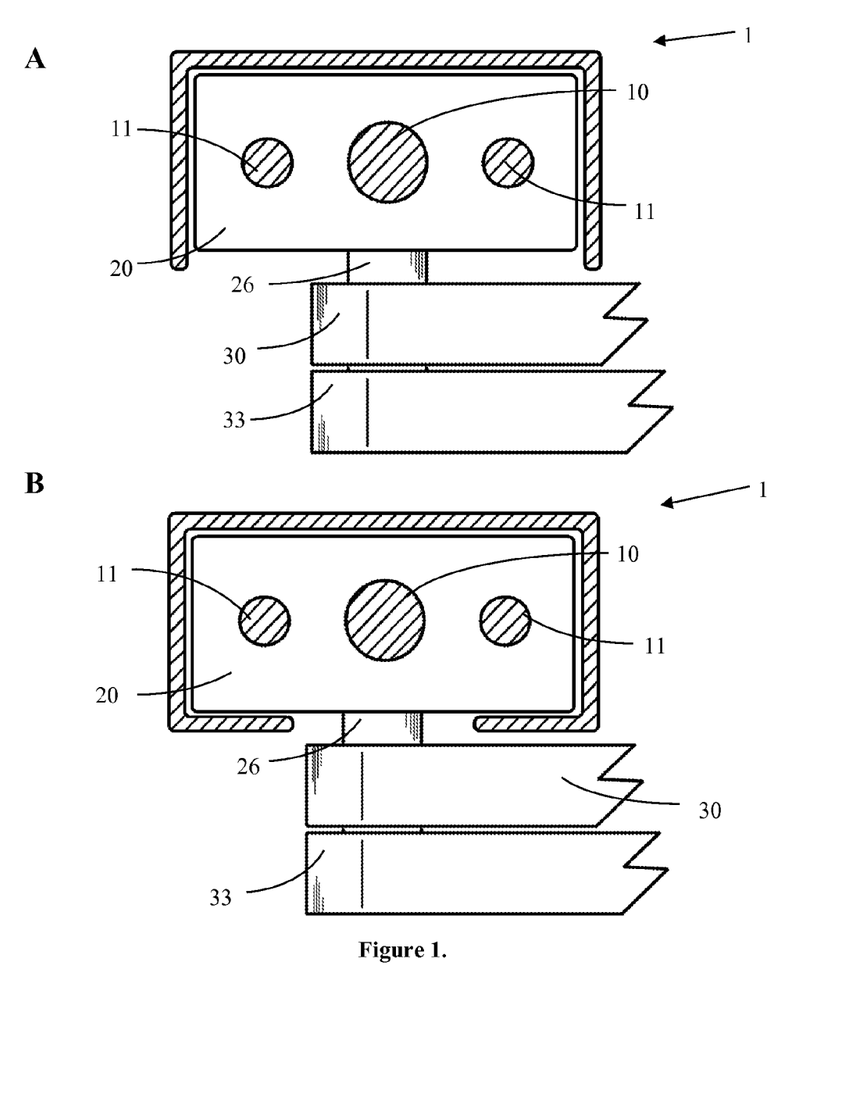
Figure 2:
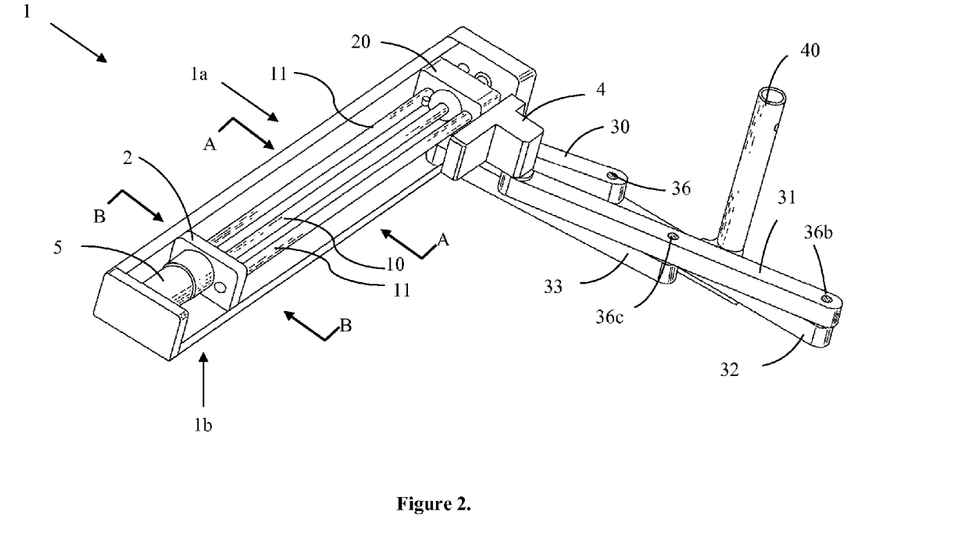
FIG. 2 is a front-quarter perspective view of the device. As shown, the device is depicted in its retracted (stored) position. The article receptacle is positioned directly behind the wheelchair back when mounted to a wheelchair.
Figure 3:
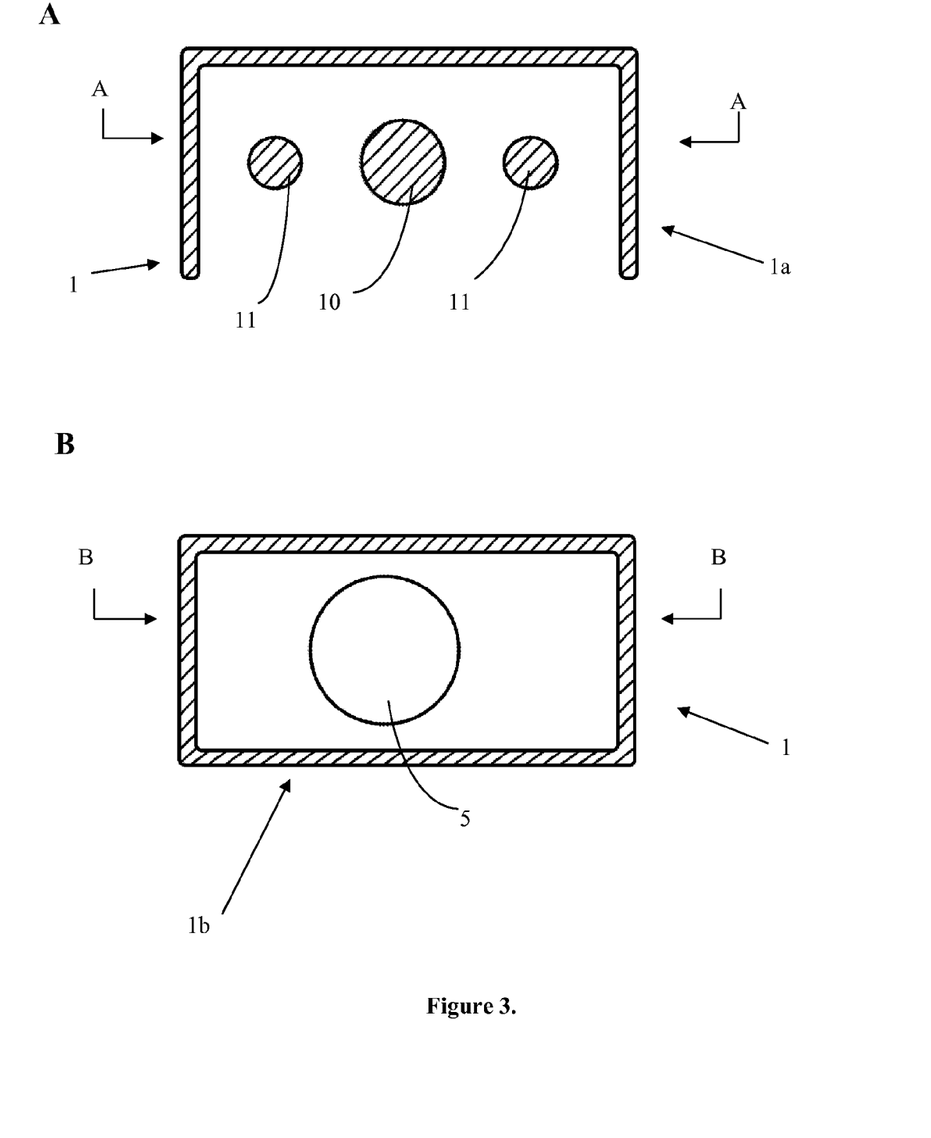

Housing body 1, is shaped as a rectangular box divided into two compartments; slider compartment 1a holding a sliding mechanism; and motor compartment 1b housing motor 5, shown in FIG. 2. At least a portion of the bottom face of housing body 1 is removed from slider compartment 1a, as seen in FIGS. 1(A) and (B). As such, slider compartment 1a is partially open to the exterior environment, seen in FIG. 3(A). Conversely, housing body 1 is optionally closed at motor compartment 1b, sealing the motor from the exterior environment, as seen in FIG. 3(B). Wall 2 separates slider compartment 1a from the motor compartment 1b, except for support rail 11 and drive rail/screw 10. In a particular embodiment, drive rail/screw 10 is a threaded screw.

Slider compartment 1a contains two support rails 11 fixedly mounted on one end to wall 2 and to a side of housing body 1 on the other end. Drive rail/screw 10 is provided in slider compartment 1a, and extends through wall 2 into motor compartment 1b. One end of drive rail/screw 10 is rotatably mounted on the side of housing body 1 adjacent to support rails 11. Drive rail/screw 10 extends through wall 2 and mounts to an output on motor 5.

Slider 20 has a series of openings for two support rails 11 and a center opening for drive rail/screw 10, thereby permitting slider 20 to mount onto support rails 11 and drive rail/screw 10. Slider 20 has a hole in one end, where slider pivot pin 21 runs through the slider, and attaches to second linkage 33 and third linkage 30, as depicted in FIGS. 1(A) and (B). First linkage 31, second linkage 33, third linkage 30, and fourth linkage 32 comprise linkage assembly 35. The remaining linkages in linkage assembly 35 are attached to the respective linkage by circular pivot point 36, as described in detail below, so that the assembly rotates freely in a horizontal fashion. The pivots connecting the linkages are depicted as pivot pins running through the pivot on the linkages, but may be made of any known pivoting attachment.

Figure 4:
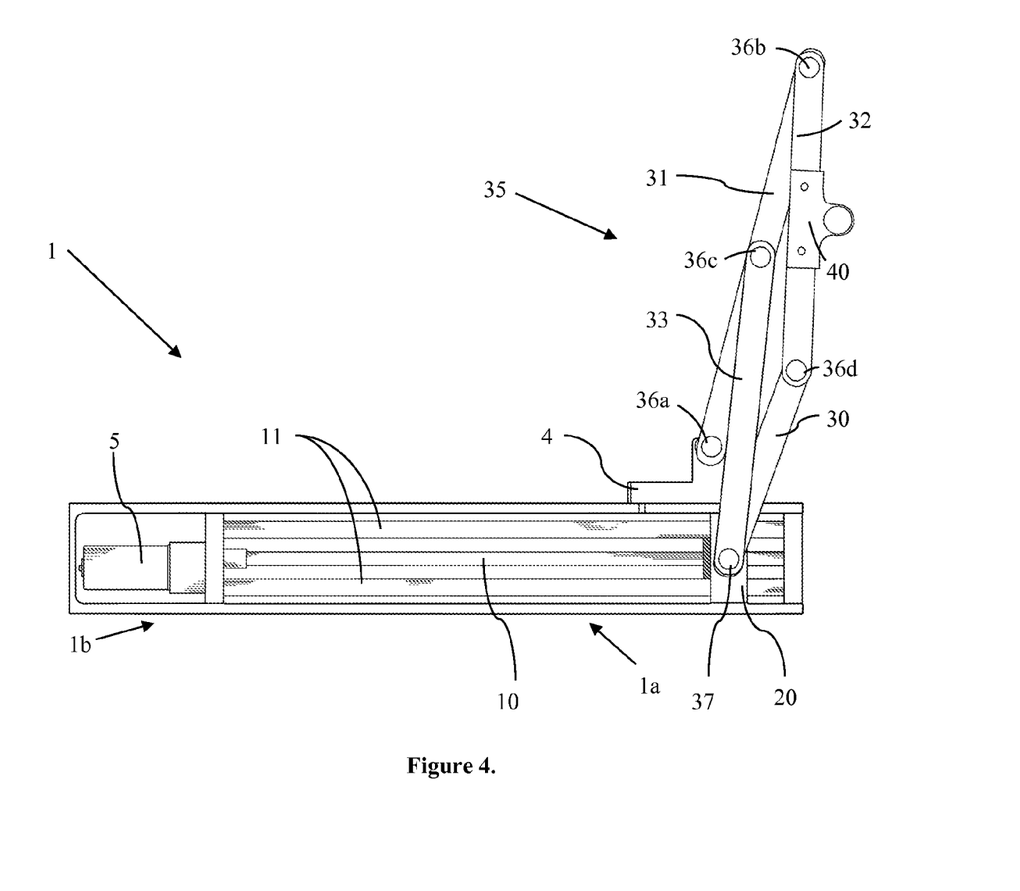
FIG. 4 is a bottom plan view of the device depicted in its retracted (stored) position.

First linkage 31 has three pivot points, first pivot point 36a on the first end of the first linkage, second pivot point 36b on the opposite end of the first linkage and third pivot point 36c disposed along the length of the linkage. First pivot point 36a is attached to linkage mount 4. Second linkage 33 attaches to third pivot point 36c on first linkage 31, and to slider 20 via linkage 37. Third linkage 30 attaches to slider 20 and fourth linkage 32 at fourth pivot point 36d. Fourth linkage 32 connects to first linkage 31 at second pivot point 36b, thereby causing linkage assembly to form a pseudo-rhomboid shape, as seen in FIG. 4.

In its stored position, slider 20 is located at the distal part of housing 1. In this position, slider 20 orients second linkage 33 at a slightly distal angle, and such that linkage assembly 35 is substantially perpendicular to the housing body, as seen in FIG. 4. The length and orientation of second linkage 33 and third linkage 30 dictate the location and orientation of fourth linkage 32, which is substantially perpendicular to housing 1 and parallel to the back of the wheelchair. Bag receptacle 40 is mounted onto fourth linkage 32.

During deployment, motor 5 activates. Any known method of activating motor 5 is contemplated, such as an electrical switch. The output of motor 5 rotates drive rail/screw 10, causing slider 20 to move proximally along support rails 11, seen in FIG. 5. The proximal movement of slider 20 causes second linkage 33 to pull on first linkage 31, resulting in linkage assembly 35 moving counterclockwise from a stored position behind the wheelchair, in an ovoid rotation.

Figure 6:
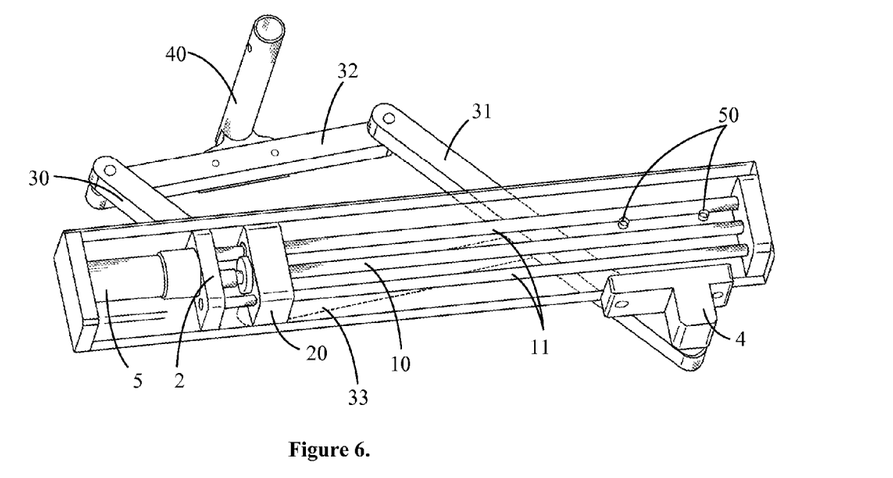
FIG. 6 is front, side perspective of the relocating device depicted in its fully deployed position.
Figure 7:
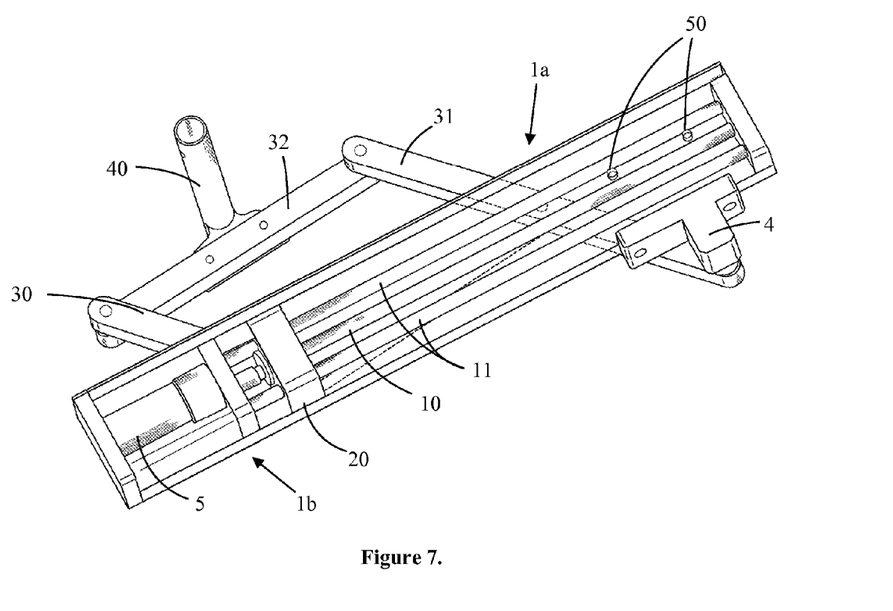
FIG. 7 is front-quarter perspective of the relocating device depicted in its fully deployed position.

Once slider 20 reaches the distal edge of wall 2, motor 5 deactivates, stopping the rotation of linkage assembly 35 in a deployed position. In the deployed position, fourth linkage 32 is substantially parallel to housing 1, as seen in FIGS. 6 and 7. A wheelchair user may easily access a backpack, bag, or other accessory, attached to bag receptacle 40. A mounting point optionally attaches to bag receptacle 40, such that the mount is pointing toward the mobility device-user. The mounting point is a mount known in the art, preferably a hook. Therefore, as slider 20 slides from a first, storing position to a second, deploying position, linkage assemble 35 rotates, moving a bag from a stored position behind the mobility device to an accessible position beside the mobility device. As noted earlier, this process slides the bag along an oblong path from the back of the mobility device to the side, advantageously keeping the bag near the wheelchair's, or mobility device's, center of gravity, enhancing stability. Additionally, because the process is accomplished without rotating the entire mechanism around a central axis, the movement of the bag from the back of the wheelchair to the side requires considerably less space than the traditional bag relocators.

Example 1

The device attaches to the mobility device using means known in the art, such as mounting points 50, seen in FIGS. 6 and 7. A plurality of mounting points 50 are disposed along the top wall of housing 1, allowing pins, screws, or other devices known in the art to affix the device to an armrest of the mobility device. The length of housing 1 may be any length practical for use of a wheelchair, and is advantageously substantially the length of the armrest.

Mounting the backpack relocator to one armrest allows the relocator to position a bag approximately centerline of the wheelchair, when in its stored position. When deployed, the backpack relocator positions the bag slightly forward of the midpoint of the armrest. However, the position of the bag depends on where bag receptacle 40 is mounted to fourth linkage 32. In this specific embodiment, mounting bag receptacle 40 closer to third linkage 30 positions the bag more proximally, i.e. more forward on the wheelchair. However, the closer bag receptacle 40 is mounted to third linkage 30, the more the bag is off-center when stored, as the bag is mover closer to the armrest and mounted backpack relocator. Conversely, mounting bag receptacle 40 closer to first linkage 31 moves the bag more distally, i.e. further back on the armrest. This reduces accessibility to the bag somewhat, but positions the bag farther from the backpack relocator when the bag is stored. This provides more stability for the wheelchair or other mobility device when the bag is stored.

Example 2

Figure 5:
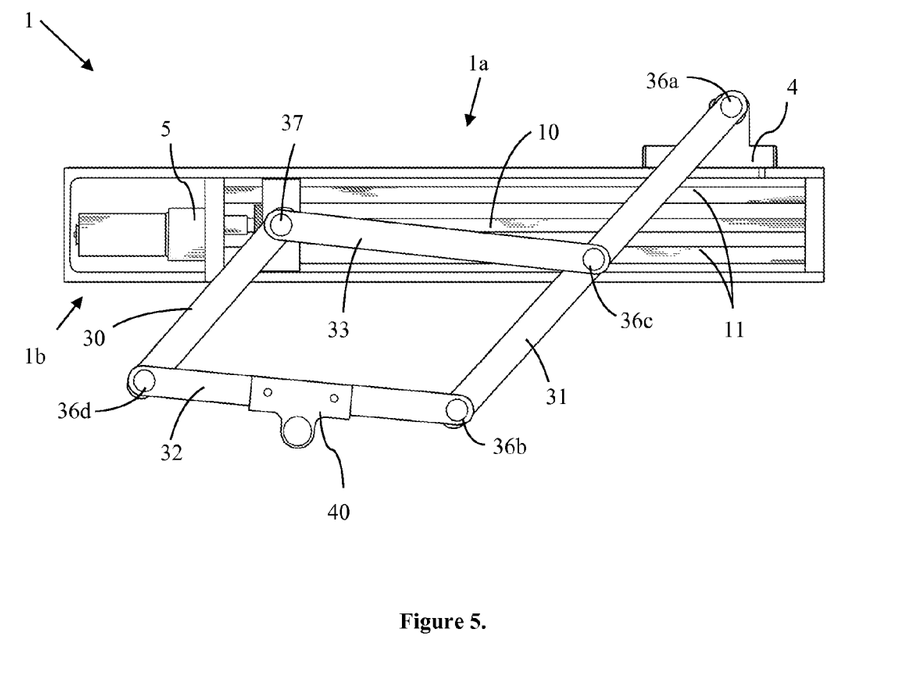
FIG. 5 is a bottom plan view of the device shown fully deployed.

The device attaches to the mobility device using means known in the art, as described in Example 1. A plurality of mounting points 50 are disposed along the side wall of housing 1, allowing pins, screws, or other devices known in the art to affix the device to the backrest of the mobility device. The length of housing 1 may be any length practical for use of a wheelchair, and is advantageously substantially the width of the backrest. It is noted that in this embodiment, the stored and deployed positions are reverse, such that FIGS. 2 and 4 depict the backpack relocator in its deployed position and FIGS. 5 through 7 depict the backpack relocator in its stored position.

The position of the bag on the backpack relocator is dependent on where to bag receptacle 40 is mounted to fourth linkage 32, as depicted in FIG. 7. For example, mounting bag receptacle 40 on fourth linkage 32 closer to first linkage 31 advantageously locates the bag closer to the centerline of the mobility device when stored, and further toward the front of the mobility device when deployed.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of the backpack relocator, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:
1. A device for use with a wheelchair or other mobility device, comprising:
   a housing having at least an upper horizontal wall, two longitudinal side walls, two transverse side walls, such that the walls define an interior lumen of the housing, and wherein the housing is adapted to mount to one side of the wheelchair;
   a drive actuator disposed in the lumen of the housing and rotatably mounted to one side of the housing;

a slider connected to the drive actuator, wherein the slider is adapted to slide between a first position and a second position;

a linkage mount disposed on a side wall of the housing;

a linkage assembly, further comprising
- a first linkage having a first end and a second end, a first pivot point disposed on the first end, a second pivot point disposed on the second end and a third pivot point disposed between the first and second pivot points, wherein the first linkage is pivotally connected to the linkage mount at the first pivot point;
- a second linkage having a first end and a second end, a first pivot point disposed on the first end and a second pivot point disposed on the second end, where the second linkage is pivotally connected to the slider at its first pivot point and pivotally connected at the second linkage pivot point to the third pivot point of the first linkage;
- a third linkage having a first end and a second end, a first pivot point disposed on the first end and a second pivot point disposed on the second end, where the third linkage is pivotally connected to the slider at its first pivot point and a forth linkage at its second pivot point;
- the fourth linkage having a first end and a second end, a first pivot point disposed on the first end and a second pivot point disposed on the second end, where the first pivot point of the forth linkage is pivotally connected to the second end of the third linkage and the second pivot point is pivotally connected to the second end of the first linkage;

a motor or crank in communication with the drive actuator;

wherein activation of the motor or crank causes the slider to move from the first position to the second position, thereby causing the linkage assembly to rotate about a vertical axis.

2. The device of claim 1, further comprising a receptacle adapted to receive an article.

3. The device of claim 2, wherein the receptacle is affixed to the fourth linkage.

4. The device of claim 2, wherein the receptacle is positioned behind the wheelchair when the slider is in the second position.

5. The device of claim 4, wherein the receptacle is positioned along the side of the wheelchair when the slider is in the first position.

6. The device of claim 1, wherein a lower wall of the housing is substantially open or open along a center of the wall.

7. The device of claim 1, further comprising at least one support rail disposed adjacent to the drive actuator.

8. The device of claim 7, further comprising a plurality of support rails.

9. The device of claim 1, wherein the drive actuator is a threaded screw, chain, belt, or rack and pinion.

10. The device of claim 1, further comprising a transverse wall disposed in the lumen of the housing, adjacent to the motor.

11. The device of claim 1, further comprising a switch in electrical communication with the motor.

12. A device for use with a wheelchair or other mobility device, comprising:

a housing having at least an upper horizontal wall, two longitudinal side walls, two transverse side walls, such that the walls define an interior lumen of the housing, and wherein the housing is adapted to mount to one side of the wheelchair;

a track disposed in the lumen of the housing and mounted to at least one of the two transverse side walls;

a slider connected to the track, wherein the slider further comprises a motor in communication with the track, and wherein the slider is adapted to slide between a first position and a second position;

a linkage mount disposed on a side wall of the housing;

a linkage assembly, further comprising
- a first linkage having a first end and a second end, a first pivot point disposed on the first end, a second pivot point disposed on the second end and a third pivot point disposed between the first and second pivot points, wherein the first linkage is pivotally connected to the linkage mount at the first pivot point;
- a second linkage having a first end and a second end, a first pivot point disposed on the first end and a second pivot point disposed on the second end, where the second linkage is pivotally connected to the slider at its first pivot point and pivotally connected at the second linkage pivot point to the third pivot point of the first linkage;
- a third linkage having a first end and a second end, a first pivot point disposed on the first end and a second pivot point disposed on the second end, where the third linkage is pivotally connected to the slider at its first pivot point and a forth linkage at its second pivot point;
- the fourth linkage having a first end and a second end, a first pivot point disposed on the first end and a second pivot point disposed on the second end, where the first pivot point of the forth linkage is pivotally connected to the second end of the third linkage and the second pivot point is pivotally connected to the second end of the first linkage;

wherein activation of the motor causes the slider to move from the first position to the second position, thereby causing the linkage assembly to rotate about a vertical axis.

13. The device of claim 12, further comprising a receptacle adapted to receive an article.

14. The device of claim 13, wherein the receptacle is affixed to the fourth linkage.

15. The device of claim 13, wherein the receptacle is positioned behind the wheelchair when the slider is in the second position.

16. The device of claim 13, wherein the receptacle is positioned along the side of the wheelchair when the slider is in the first position.

17. The device of claim 12, wherein a lower wall of the housing is substantially open or open along a center of the wall.

18. The device of claim 12, further comprising at least one support rail disposed adjacent to the track.

19. The device of claim 12, further comprising a switch in electrical communication with the motor.

* * * * *